US010152394B2

(12) United States Patent
Demetriou et al.

(10) Patent No.: US 10,152,394 B2
(45) Date of Patent: Dec. 11, 2018

(54) DATA CENTER COST OPTIMIZATION USING PREDICTIVE ANALYTICS

(71) Applicant: International Business Machines Corporation, Armonk, NY (US)

(72) Inventors: Dustin W. Demetriou, Poughkeepsie, NY (US); Vidhya Shankar Venkatesan, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/277,731

(22) Filed: Sep. 27, 2016

(65) Prior Publication Data

US 2018/0089042 A1 Mar. 29, 2018

(51) Int. Cl.
*G06F 11/34* (2006.01)
*G06F 11/20* (2006.01)
(Continued)

(52) U.S. Cl.
CPC .......... *G06F 11/20* (2013.01); *G06F 11/3006* (2013.01); *G06F 11/3058* (2013.01); *G06N 5/022* (2013.01); *G05B 23/0283* (2013.01); *G06F 11/008* (2013.01); *G06F 11/3409* (2013.01); *G06Q 10/10* (2013.01); *G06Q 10/20* (2013.01)

(58) Field of Classification Search
CPC ............... G06F 11/008; G06F 11/3058; G06F 11/3409; G06Q 10/10; G06Q 10/20; G05B 23/0283
See application file for complete search history.

(56) References Cited

U.S. PATENT DOCUMENTS 5,867,809 A * 2/1999 Soga ..................... G07C 3/00
340/588
7,370,241 B2 5/2008 Nicholson et al.
(Continued)

OTHER PUBLICATIONS

Callou et al., "Estimating Sustainability Impact, Total Cost of Ownership and Dependability Metrics on Data Center Infrastructures," 2011 IEEE International Symposium on Sustainable Systems and Technology (ISSST 2011), Chicago, IL, USA, May 16-18, 2011, pp. 1-6.

(Continued)

*Primary Examiner* — Joseph O Schell
(74) *Attorney, Agent, or Firm* — Scully, Scott, Murphy & Presser, P.C.; Tihon Poltavets

(57) ABSTRACT

A system, method and computer program product for optimizing total cost of ownership (TCO) of a piece of IT equipment, e.g., a hard drive or server, using predictive analytics. The data center environment monitors and measures a number of environment variables, including temperature, Relative Humidity, and corrosion. For each piece of hardware, several pieces of data are assigned, including a criticality measure, an operational cost (function of environment), a static replacement cost, and a downtime cost (function of time). For each piece of hardware, if it has not yet failed, the system predicts a time-to-failure using the environment variables. If predicted time-to-failure exceeds an expected reference life criteria, real time TCO analytics is performed to minimize data center energy usage and/or maximize operational cost-efficiency.

12 Claims, 8 Drawing Sheets

(51) Int. Cl.
*G06N 5/02* (2006.01)
*G06F 11/30* (2006.01)
*G06Q 10/00* (2012.01)
*G06F 11/00* (2006.01)
*G05B 23/02* (2006.01)
*G06Q 10/10* (2012.01)

(56) References Cited

U.S. PATENT DOCUMENTS

| | | |
|---|---|---|
| 7,484,132 B2 | 1/2009 | Garbow |
| 8,572,003 B2 | 10/2013 | Laicher et al. |
| 8,965,748 B2 | 2/2015 | Iyengar et al. |
| 2002/0062454 A1* | 5/2002 | Fung .................. G06F 1/3203 713/300 |
| 2007/0078528 A1* | 4/2007 | Anke .................. G07C 5/006 700/21 |
| 2007/0079170 A1 | 4/2007 | Zimmer et al. |
| 2007/0150236 A1* | 6/2007 | Warizaya ............ G06F 11/008 702/184 |
| 2009/0037206 A1* | 2/2009 | Byrne ................. G06Q 10/06 705/305 |
| 2009/0265118 A1* | 10/2009 | Guenther ............ G06Q 10/06 702/34 |
| 2009/0312999 A1* | 12/2009 | Kasztenny .......... G05B 17/02 703/13 |
| 2011/0046995 A1* | 2/2011 | Nishimura .......... G01H 17/00 705/7.12 |
| 2014/0181595 A1* | 6/2014 | Hoang ................ G06F 11/3034 714/47.3 |

OTHER PUBLICATIONS

Hardy et al., "An Analytical Framework for Estimating TCO and Exploring Data Center Design Space," 2013 IEEE ISPASS, Apr. 2013, pp. 54-63.

Rhee et al., "Life Cost-Based FMEA Using Empirical Data," ASME 2003, International Design Engineering Technical Conferences, Chicago, IL, Sep. 2-6, 2003, pp. 1-9.

Koomey et al, "A Simple Model for Determining True Total Cost of Ownership for Data Centers," Uptime Institute White Paper, Version 2, 9 pages, Jan. 2007.

\* cited by examiner

DATA CENTER COST OPTIMIZATION USING PREDICTIVE ANALYTICS

FIELD

The present disclosure relates to the data centers generally, and particularly to a system and method for monitoring conditions at a data center and maintaining and optimizing reliability of IT (information technology) hardware assets and equipment used in data centers in a cost effective manner.

BACKGROUND

It is very challenging to understand the impact of a data center environment on IT hardware failure and the overall data center total cost of ownership. Furthermore, it has been seen that in certain instances, when a piece of hardware fails and is removed from the data center and brought to the lab for failure analysis, the hardware does not display the same symptoms. Therefore, it is important to monitor the environmental conditions specific to each-and-every data center and map the pattern of hardware failure to the overall business and data center environmental conditions. The expanded American Society of Heating, Refrigerating, and Air-Conditioning Engineers (ASHRAE) allowable envelopes further put IT equipment at an increased risk of degraded reliability.

SUMMARY

There is provided a system and method and computer program product for achieving a lowest cost data center operating environment that addresses a trade-off in a cost savings that would result from a modifying one or more environmental conditions at the data center or a cost of replacing a hardware equipment in the operating data center.

In one aspect, sensor devices monitor the environmental conditions of an IT data center, such as temperature and power sensors. Machine learning and cognitive capabilities are implemented for correlating a large number of these variables. Using predictive analytics capabilities, algorithms are implemented to correlate the expectation of hardware failure to a business objective, e.g., a minimized overall cost to the business. In response, there may be determined actions that can be taken to mitigate or minimize the hardware failure rate over extended time.

There is further provided a computer-implemented system and method for optimizing a total cost of ownership (TCO) of a piece of IT equipment, such as a hard drive or server, using predictive analytics algorithms.

According to a first aspect, there is provided a computer-implemented method to manage environmental conditions of a data center. The method comprises: receiving, at a processor unit, sensor data from sensors monitoring environmental conditions at a data center housing operating components that have not yet failed; deriving, at the processor unit, an estimated time to failure of a component using a model correlating a component reliability and environmental conditions; and determining, using the estimated time to failure of a component, a modification to the data center, wherein the modification minimizes energy usage and improves a cost-effectiveness of operations at the data center environment.

In a further aspect, there is provided a computer-implemented system for managing environmental conditions of a data center. The system comprises: a memory storage device storing program instructions; at least one hardware processor coupled to the memory storage device and running said program instructions to configure said at least one hardware processor to: receive sensor data from sensors monitoring environmental conditions at a data center housing operating components that have not yet failed; derive an estimated time to failure of a component using a model correlating a component reliability and environmental conditions; and determine, using said estimated time to failure of a component, a modification to said data center, wherein said modification minimizes energy usage and improves a cost-effectiveness of operations at the data center environment.

In a further aspect, there is provided a computer program product for performing operations. The computer program product includes a storage medium readable by a processing circuit and storing instructions run by the processing circuit for running a method. The method is the same as listed above.

BRIEF DESCRIPTION OF THE SEVERAL VIEWS OF THE DRAWINGS

Embodiments are described in more detail in conjunction with the accompanying drawings, in which.

DETAILED DESCRIPTION

Figure 1:
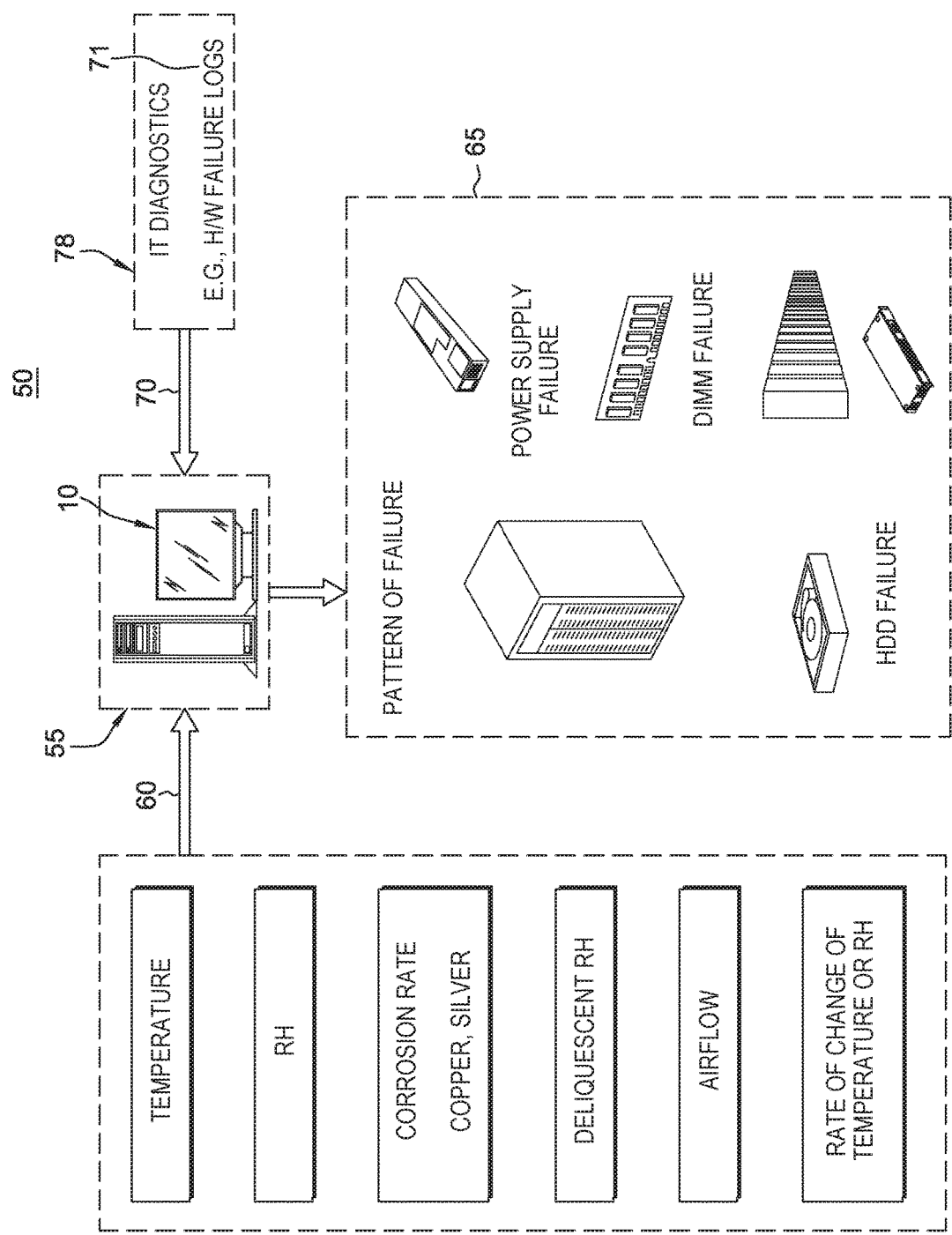
FIG. 1 depicts an overview of a system and methodology for data center infrastructure management based on data center parameters and other information according to one embodiment of the disclosure.

With reference now to FIG. 1, there is provided a system and methodology for data center infrastructure management that includes receiving data center parameters for use in optimizing a business objective such as a total cost of ownership (TCO) of a piece of IT equipment according to one embodiment. As shown in FIG. 1, a data center 50 includes a computing system 55 embodied as a predictive analytics server 10.

In one aspect, sensor devices, such as temperature and power usage sensors, continuously or periodically monitor the environmental conditions of an IT data center. The predictive analytics server 55 implements machine learning and its cognitive capabilities for correlating a large number of variables. Using predictive analytics capabilities, algorithms are implemented to correlate the pattern of hardware failure to a business objective, e.g., an overall cost to the business.

In one aspect, an actual time to failure of the components (which is different for every data center) are derived based on sensor data, failure logs and diagnostics and may be determined using a machine learning algorithm.

In an example implementation, methods are implemented for analyzing the weightage of cost benefits and a business impact of avoiding the component failure or extending the component life vs. savings in energy cost by allowing the data center to run under a different environmental condition, e.g., a higher temperature or lower humidity environmental condition.

One key factor to computing a TCO is based on the reliability (e.g., time to fail) of the components in the data center vs. energy efficiency. The outcome of the algorithms implemented provides information in advance to the operator with regards to time to failure of particular hardware component to enable an informed decision making in terms of replacing the component as inventory.

In one embodiment, shown in FIG. 1, the predictive analytics server 55 receives data and information 60 specific to a data center 50 including physical conditions and/or environmental parameters including, but not limited to: temperature conditions, Relative Humidity (RH) conditions, Corrosion Rate values (e.g., for copper, silver and other metals), a deliquescent relative humidity value, an air flow value and a rate of change of temperature or relative humidity value (RH) which may drive the hardware failures. In addition, the predictive analytics server of system 55 receives data 70 received from hardware failure logs 71 (e.g., within the hardware or firmware) concerning hardware failures (e.g., of a rack, a fan, a hard drive, a server, or a power supply), manual logs 72 and/or system logs 74, e.g., diagnostics.

Based on the received data center specific conditions/parameters data 60 and log data 70, the system 55 employs predictive analytics. That is, given the data center specific physical conditions or parameters 60 and data center specific logs data 71, 72, 74, machine learning algorithms may be employed to discern patterns of failure 65 (e.g., hardware failures), cost of failures and/or down time specific to a data center. The analytics employed may further generate data useful for optimizing a data center's specific infrastructure.

In particular, using predictive analytics capabilities of system 55, algorithms are implemented to correlate the pattern of hardware failure to the overall cost to the business. In response, there may be determined actions that can be taken to mitigate or minimize the hardware failure rate over extended time. The predictive server analytics are run in order to: 1. reduce the impact of downtime due to a predicted hardware failure; 2. optimize the energy use by taking decision based on analytical method to arrive at the right range of temperature, relative humidity (RH), corrosion rate, air flow rate, etc. to be maintained; and 3. Optimize the TCO for a business. In one embodiment, a particular predictive algorithm may be mapped to a particular data center.

Figure 2:
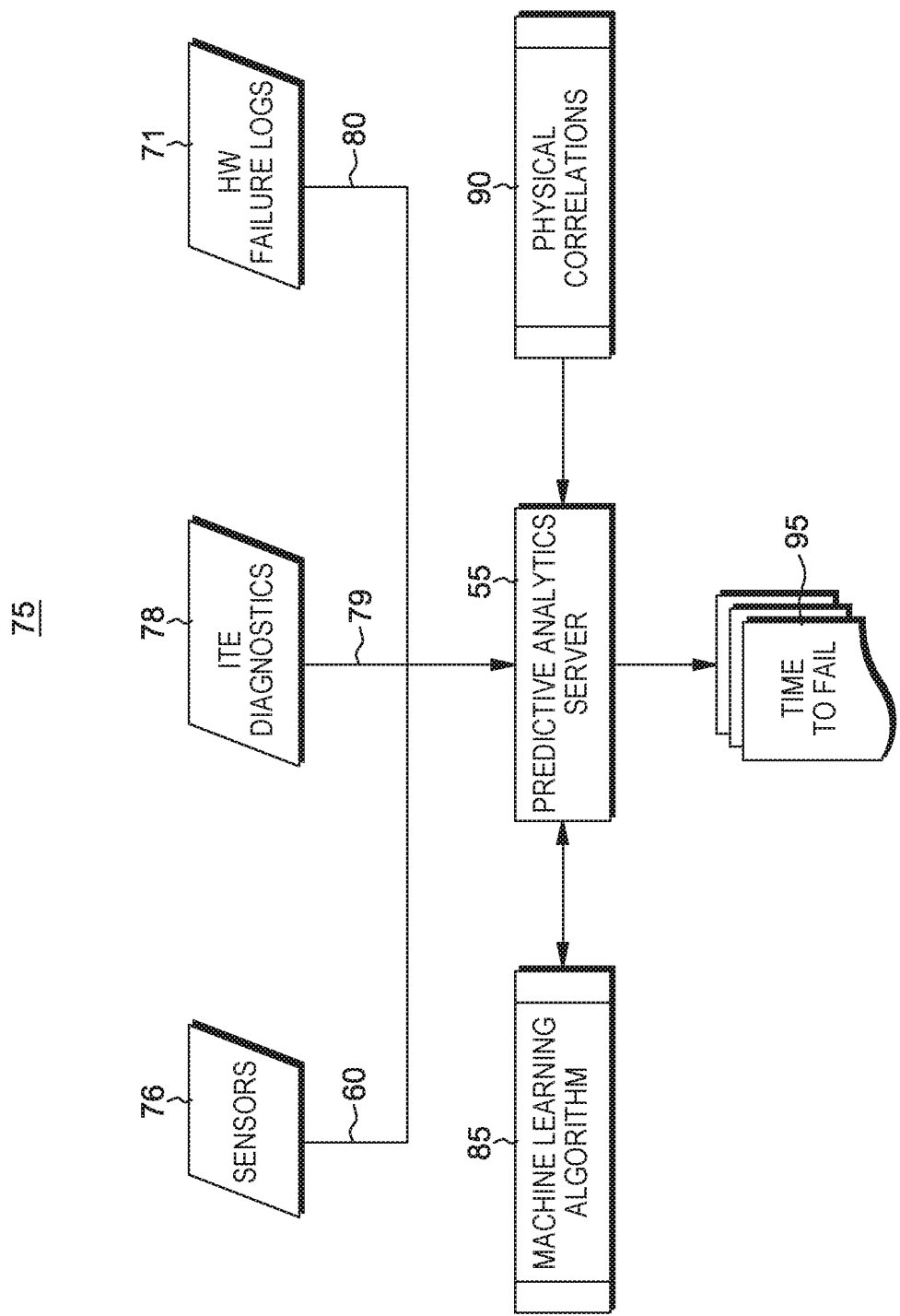
FIG. 2 shows a system diagram for implementing time-to-fail predictive analytics—for generating "time-to-fail" analytics data in one embodiment.

FIG. 2 shows a system diagram 75 for implementing time-to-fail predictive analytics—for generating "time-to-fail" analytics data 95 representing a pattern of when hardware will fail for components, such as a hard disk drive (HDD), a power supply unit (PSU) and dual in-line memory modules (DIMM).

Generally, as shown in FIG. 2, data center 50 employs a variety of sensor devices 76, e.g., temperature sensors, humidity sensors, etc. that monitor, measure and provide a number of environmental variables/parameter data and information 60, e.g., temperature, relative humidity (RH), corrosion, and air flow, for predictive analytics. Further, as shown in FIG. 2, information technology equipment (ITE) 78 pertaining to the data center provide diagnostics data 79, e.g., from the various hardware logs and sensors information for predictive analytics. Further, a system administrator may enter or provide data 80 from the hardware failure logs 71.

In one embodiment, shown in FIG. 2, system 55 includes a predictive analytics server that provides predictive analytics capabilities to generate time-to-fail data 95 of each of the pieces of hardware equipment. In one embodiment, a machine learning algorithm process 85 is employed as is a process 90 for determining physical correlations. These algorithms are run in order to correlate the pattern of hardware failure to the overall cost to the business.

One example of a physical correlation for time-to-fail analysis considers a piece of electronics equipment that could have a number of air moving devices (fans). The failure of these devices is dependent on the operational environment in which they run (i.e., the data center). The Weibull distribution is a well-known tool for estimating the statistical failure of mechanical parts, including fan bearings. The two-parameter Weibull Cumulative Distribution Function is given by:

$$F(t) = 1 - e^{-(t/\alpha)^\beta}$$

where F(t) is the probability of failure at time t, $\beta$ is the shape factor and $\alpha$ is a characteristic life. The $\beta$ and $\alpha$ parameters are for a specific fan and obtained from the manufacturer. One of the mechanisms of failure is the wear out of the bearing grease. In this example, it is known that the three most important properties for bearing grease life are operating temperature, fan's rotational speed and the material properties of the grease. Tools such as the SKF grease life curves can be used to determine the impact of a fan's life as a function of temperature. (See, for example, SKF Maintenance and Lubrication Products 2006/02 USA #711-639, MP3000E).

According to a further embodiment, analytics server algorithms employed herein provide suggested actions to minimize the total cost of ownership of hardware failures which actions include, but are not limited to: a) reducing the impact of downtime due to hardware failure; b) optimizing the energy use by taking decision based on analytical method to arrive at the right range of temperature, RH and free cooling to be maintained; or c) optimizing the TCO for a business or asset.

As machine learning and cognitive algorithms (e.g., neural network algorithms, genetic algorithms, etc.) rely on data sources to provide prediction, the accuracy of the prediction is as good as the data sources and improves as more data is added to a corpus. The expectation time to failure 95 of the hardware is based on a statistical confidence level that can be set by the user.

By running the predictive analytics results in optimizing the overall TCO and overall required level of reliability of the data center component.

For each hardware component, if it has not yet failed, the method predicts a time-to-failure using the environment variables and logged data. If a predicted time-to-failure exceeds an expected reference life criteria, there is performed a real-time TCO analytics comprising the steps as shown and described in greater detail herein below.

In an exemplary embodiment, analytics server 55 or another computing device, implements in real-time or periodically, methods of FIGS. 3-7 that determine what would be the TCO involved if a piece of hardware that is expected to fail in some time (based on the machine learning algorithm (a predictive analytics model) that keeps track of patterns of hardware failures) were to be replaced. Then based on this, methods to weigh the impact of allowing/ replacing the hardware expected to fail vs. taking corrective action in terms of data center environment that can impact the energy cost. Based on this comparison, the system 55 generates a well informed output 95 that may be generated and communicated or presented to an entity as a suggestion or warning of a hardware failure vs. energy cost. In a further embodiment, an output may include automatically initiating a computed modification to the data center, e.g., environmental condition, based on the impacted energy costs.

There are several predictive analytics models that can be used to predict component failures based on data center environmental parameters. One example of a very simple model is presented by the American Society of Heating Refrigeration and Air Conditioning Engineers (ASHRAE) in *Best Practices for Datacom Facility Energy Efficiency*. One example provides a monotonically increasing function of a refrigeration system's coefficient of performance (COP)—or the ratio of the amount of heat removed to the power required to remove the heat—as a function of temperature. This can be used to compute what the savings in refrigeration power would be if the data center temperature was increased. Another example model may be found in: Khalifa, H. E., Demetriou, D. W. (2010) entitled "Energy Optimization of Air-Cooled Data Centers," Journal of Thermal Sciences and Engineering Applications, Vol. 2, 041005.

Figure 5:
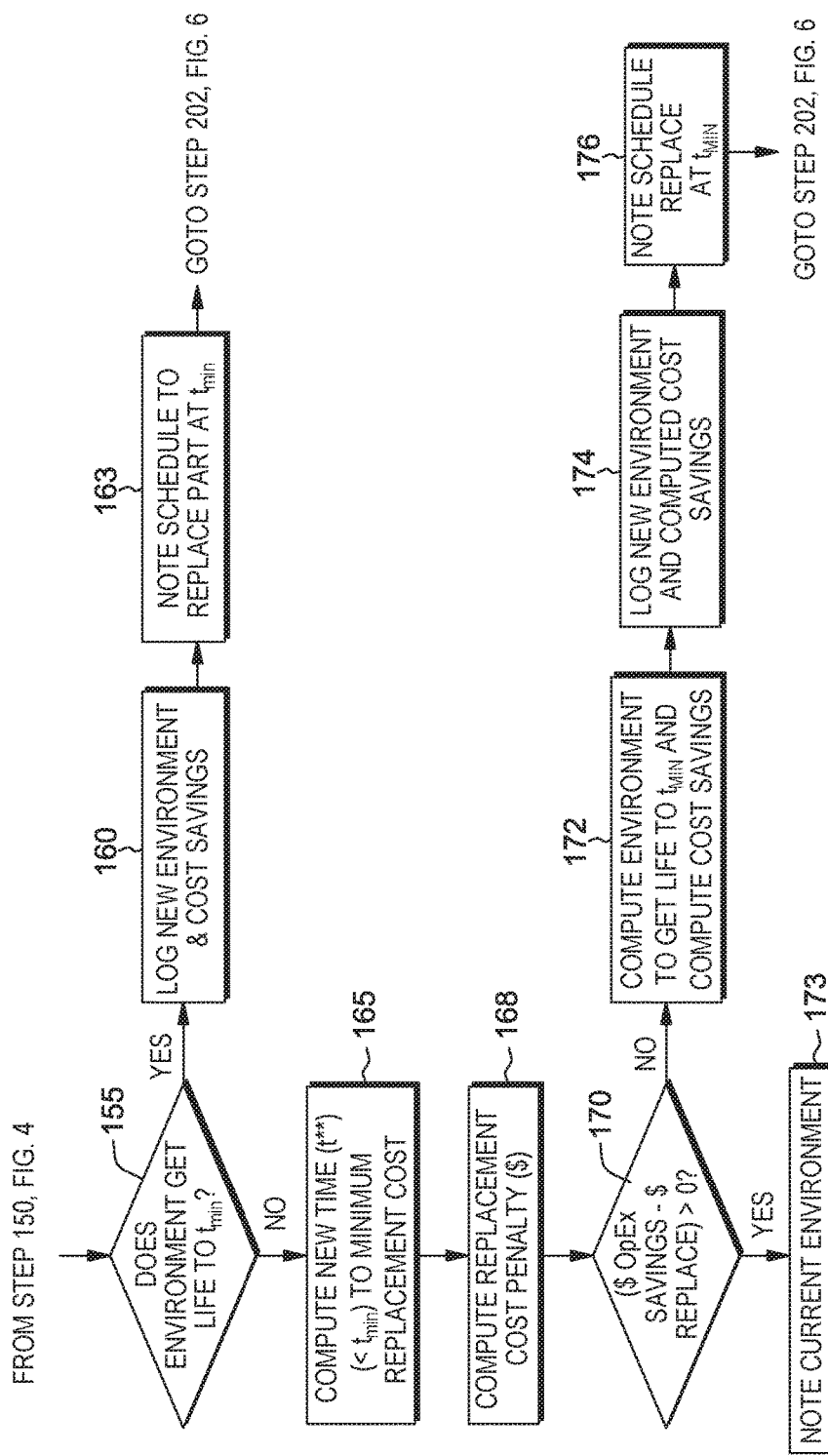
Figure 6:
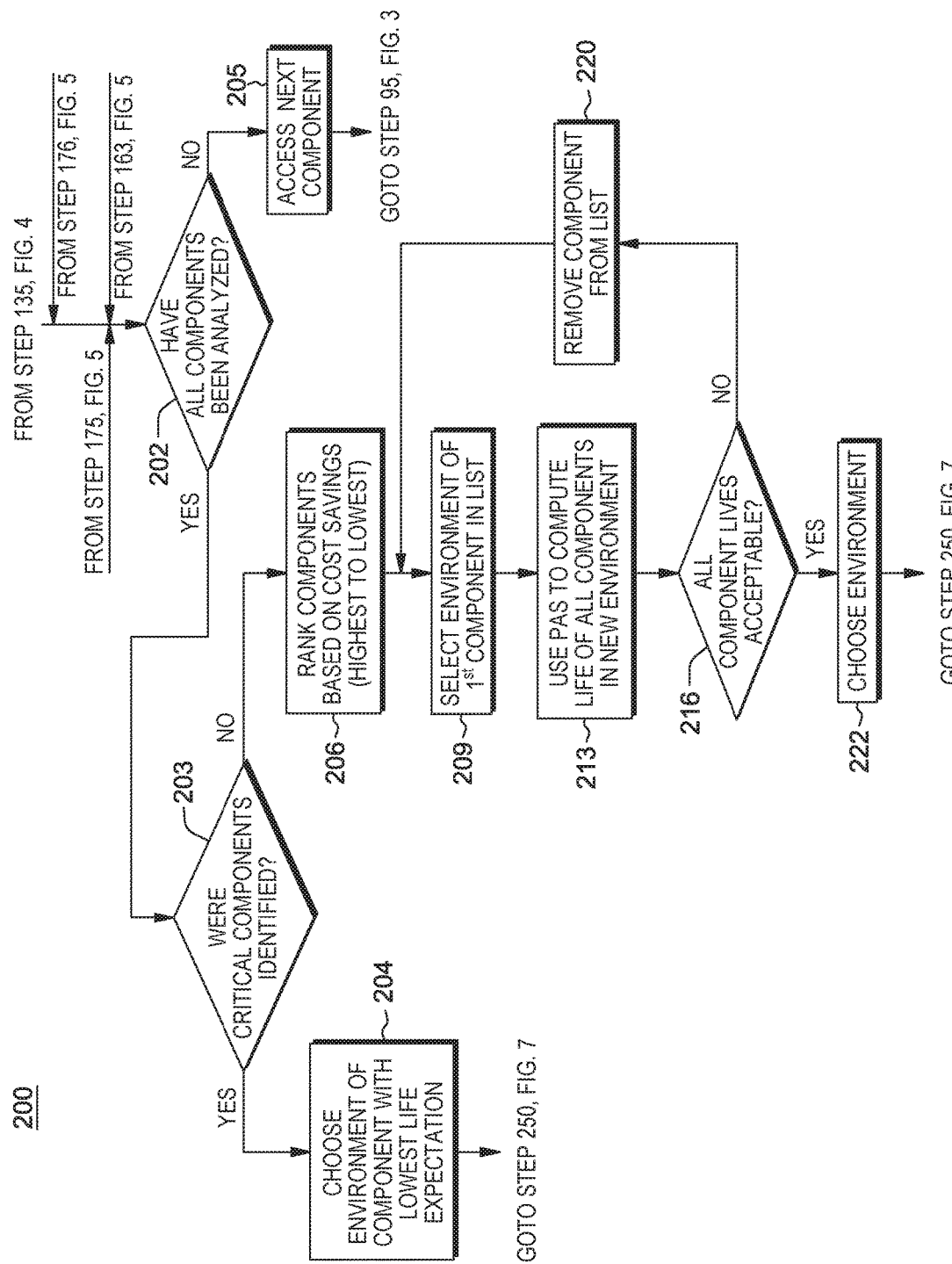
FIG. 6 shows an overall method for maximizing a cost-efficiency of a data center using the results of the analytics methods of FIGS. 4-5.

FIG. 6 shows an overall method 200 for maximizing a cost-efficiency of a whole data center or portion thereof, using the predicative analytics modeling. In one embodiment, the method of FIG. 6 is processing performed upon all (or a sub-set of) non-failed critical and non-critical components of a data center, where each selected component is subject to the real-time TCO analysis processing steps of FIGS. 3-5 explained below. Ultimately, after running methods of FIGS. 3-5, there is determined for each component, what data center environment that component should be subject to, what is the cost savings, and when it is to be replaced.

Figure 3:
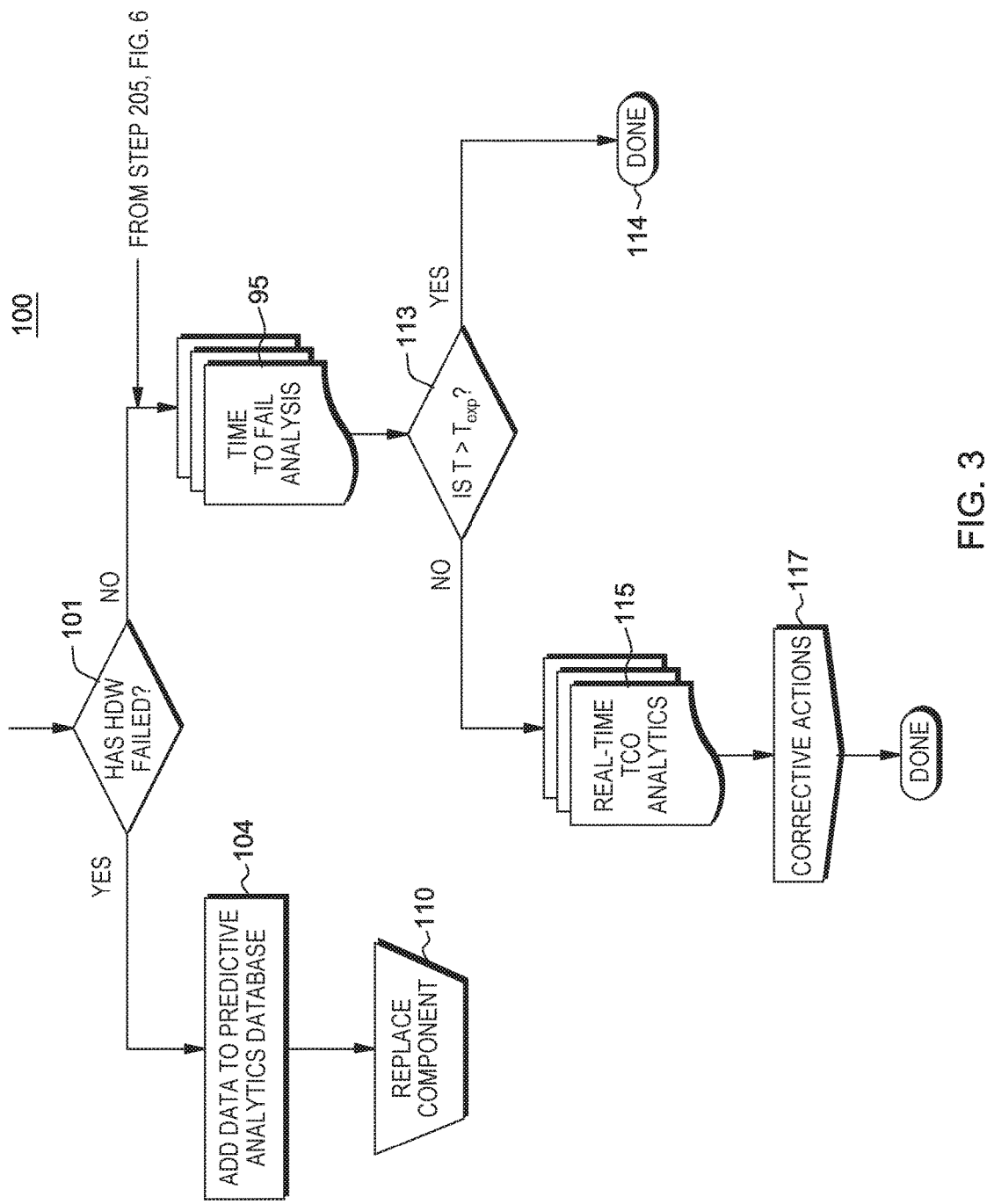
FIG. 3 shows an operational method 100 for real-time TCO analytics applied to each hardware component.

Turning now to FIG. 3, there is shown an operational method 100 for real-time TCO analytics applied to each hardware component. In one embodiment, method 100 may be run continuously in the data center and iterated over all or subsets of components of the data center. For each piece of hardware (i.e., a component) the method assigns several "traits", i.e., pieces of data, for that component including, but not limited to: how critical is it (e.g., a hard disk drive is a more critical component than a fan); its operational cost of running the hardware (e.g., as a function of environment); its replacement cost (a static cost, e.g., capital and maintenance cost); and its downtime cost (e.g., as a function of time). Each of these operational, replacement and/or downtime costs are known for a particular data center, and may be designated in cost units (e.g., dollars $).

In the method 100 depicted in FIG. 3, (for each hardware component) a determination is first made at 101 to determine whether that hardware component has failed. If a hardware component as failed at 101, then this determination is added to a predictive analytics database at 104 for storing the predictive analysis data (including data indicating a time of failure and any associated data center environmental conditions) for the data center. This information may then be used to extend/build the predictive analytics model correlating a component's time-to-live to environmental parameters at the PAS. Since a component has failed, that hardware component is replaced at 110.

Otherwise, returning to step 101, if there is no hardware failure, then a time-to-fail predictive analysis is performed to obtain a determined time-to-fail data 95 as determined in the analysis method 75 shown in FIG. 2, and a comparison is made to compare the expected time-to-failure time (t) to an expected reference life criteria ($t_{exp}$), where $t_{exp}$, represents the expected life of a piece of IT hardware (e.g., 3 years expected life for a low-end server). Particularly, at 113, a determination is made as to whether the remaining life (a predicted time-to-fail) is greater than its reference life expectation, i.e., $t > t_{exp}$. If this condition is met, i.e., the predicted remaining life is greater than the expected life, i.e., $t > t_{exp}$ (i.e., the piece of equipment has more life on it than its predicted time to failure), then the process terminates at 114 (i.e., nothing needs to be done in that the predicted time-to-fail or the remaining life of the piece of equipment is less than the reference time it is expected to live). Returning back to 113, if it is determined that $t <= t_{exp}$, i.e., the predicted time to failure is not greater than the expected life of that component, then the process continues to 115 where a further real-time TCO analytics process is employed to determine if any corrective actions 117 may be taken to optimize a business impact, e.g., a cost of ownership of that component. Such corrective actions may include but are not limited to: changing the environment in the data center, or scheduling for replacing and replacing a part thereof. After performing any corrective actions at 117, the process ends.

In the example of an expected reference life criteria ($t_{exp}$) of a fan, most fans used in electronics equipment today have an expected life (e.g., $L_{10}$) of 60,000 hours. That is, after 60,000 total operational hours 10% of the population of fans would fail.

Figure 4:
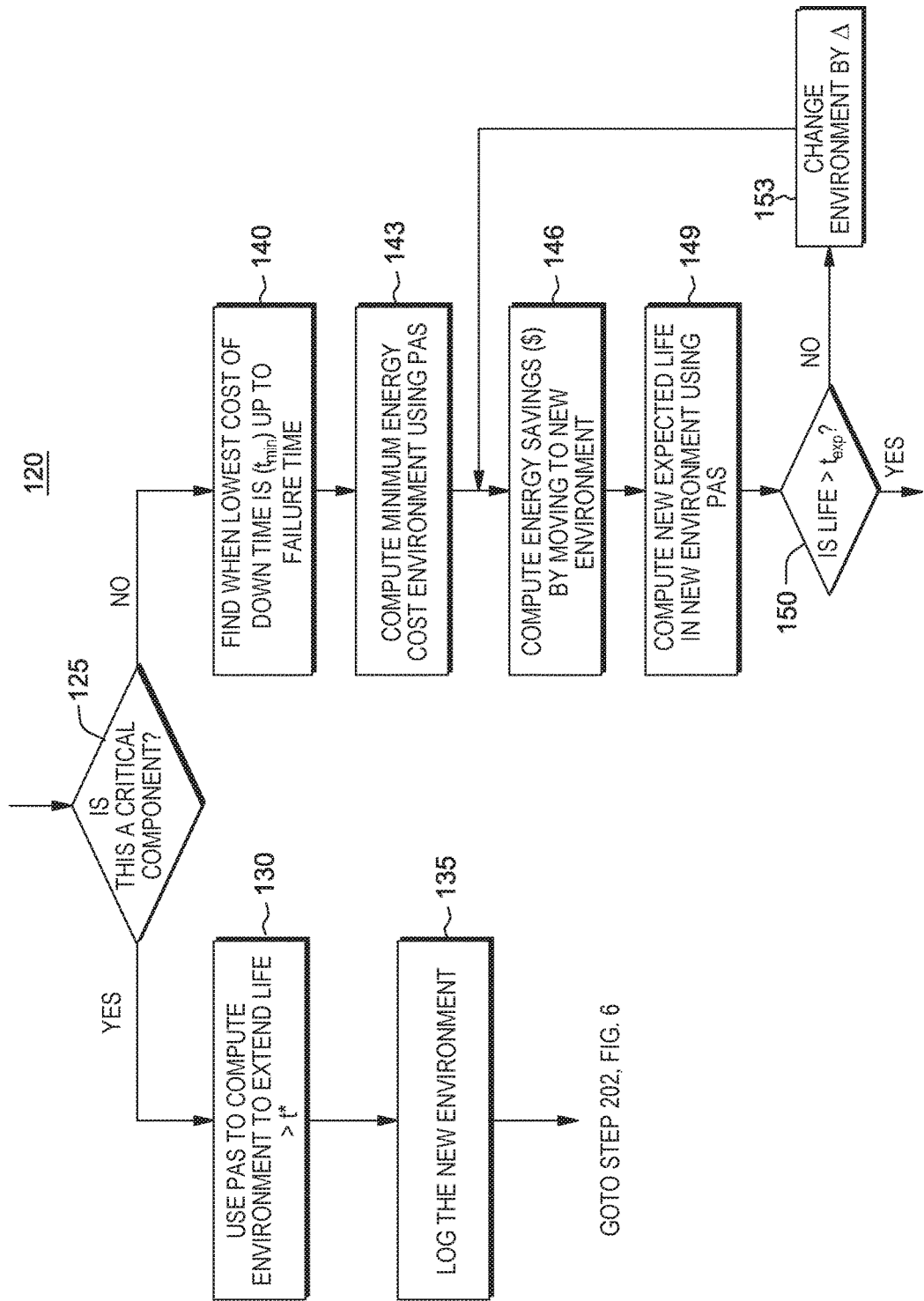
FIGS. 4-5 show the a TCO analytics method for conducting using the predictive analytics modeling.

FIGS. 4 and 5 depict the real-time TCO analytics method 120 employed at step 115, FIG. 3. At a first step 125, a determination is made as to whether the hardware component was a "critical" hardware component. A critical component is a component that has been assigned a critical measure to indicate that the component is critical to the operation of the data center. One non-limiting example of a critical component is a power supply or a hard disk drive that is important to maintain for real-time operations. This is determinable from the data assigned to the current hardware component which indicates a criticality of the component. If it is determined that the hardware component was a "critical" hardware component, then the predictive analytics server ("PAS") 55 runs programs to invoke methods to compute at 130 an environment (i.e., changing a temperature or humidity of data center) for the data center that is calculated to extend the life of that piece of equipment to be greater than a certain time threshold, i.e., extend the life to be greater than a time t*, where t* is a value representing a time buffer (i.e., difference) between the expectation of a failure of that component and when a business' risk of replacement of that component is acceptable.

As an example of failure buffer time (t*), t* represents the time it takes to replace the critical component. For example, it may be on the order of weeks for a part (e.g. a server) to be ordered and installed. If a part is stocked, it may be hours to replace it. For a critical component, it is most important that the component get replaced quickly, most of the time regardless of the cost.

The PAS 55 is thus employed to determine an environment to extend life of that piece of equipment for at least that downtime period. For example, if an example data center is running warm, there may be computed a new life of that equipment at a lower data center temperature that would extend life of component, e.g., by one month. For a critical component, the data center temperature may be responsively changed lower to extend the life of the equipment for at least that one month. Thus, for example, if a time t* for a critical component is one month (e.g., the lead time it takes to install server and replace it), then the environment change is computed to extend the life of that piece of equipment for the time t* so that it does not fail.

In one embodiment, the model used to predict the new remaining time-to-live value for that critical piece of equipment may perform a trade-off analysis such that, based on the parameters (e.g., temperature, humidity, airflow), the model may determine a new expected time-to-fail life by a determination that, for example, a data center temperature should be reduced or humidity should be reduced or both temperature and humidity should be reduced to determine to what extent that component's life may be extended.

Continuing at 135, FIG. 2, the environmental parameters, e.g., temperature, humidity, etc. as modified by the PAS determination for the data center to modify the data center environment having changed parameters associated with that component is logged or otherwise recorded into the system. Then, the process continues to 202, FIG. 6 in order to further perform real-time TCO analytics at the data center level for achieving the most cost-effective operating data center environment.

Otherwise, returning to 125, FIG. 4, if it is determined that the hardware component is not a critical component, then the process proceeds to 140 to analyze a trade-off in terms of maximizing energy costs savings by modifying the environment or replacing the component at some future time in a manner that minimizes cost. The analysis includes computing a lowest cost time to replace a component in the data center. The determination of a lowest cost time to replace may occur during a routine maintenance run of that component at a future scheduled time, e.g., as compared to off-cycle. This is referred to as lowest cost down time is ($t_{min}$) up to the failure time and indicates the combination of business risk and replacement cost. For example, it may be determined at this step that a cost to replace a non-critical component in the data center is a lowest cost during a time of a routine maintenance cycle of the data center in which it may be more cost-effective to change the component as compared to during an off-cycle. Thus, an example of $t_{min}$ is the time when the business would incur the lowest cost to replace or repair a part that has failed. For example, if a part is redundant, such as the case of a fan, the failure of one fan is typically not critical and the electronics equipment can survive. Most companies have regular maintenance schedules for equipment. It would be most cost effective to schedule these other maintenance activities at the same time. The maintenance schedule is a function of the particular component or piece of equipment.

Then, at 143, FIG. 4, this determination leads to computing a minimum energy cost environment using the predictive algorithms run at the PAS server. This step determines how the data center environment should be changed to minimize cost of operating the piece of hardware. For example, using the predictive analytics model, it may be determined that raising the temperature of a data center may save in electricity costs (regardless of any piece of equipment). Continuing to 146, the system implements methods to compute an energy savings (e.g., an operational cost savings "$ OpEx Savings") by moving to that new data center environment. For example, raising the temperature in the new environment, e.g., by 2 degrees, may save $100K in energy cost. Then, after computing an environment that minimizes a cost to operate, at 149, using the PAS, the method computes a new expected life (time-to-fail) value ("life") for the components should it be moved to the in the new lowest cost operating environment of the data center. For example, the life of some components operating in the modified low-cost operating data center environment may be expected to decrease commensurate with a rise in operating temperature at the new operating data center environment. Continuing at 150, a determination is made as to whether the new expected life value for that component at the modified environment is greater or less than the expected reference life criteria value $t_{exp}$, i.e., whether:

$$\text{life} > t_{exp}.$$

If, at 150, it is determined that the computed new expected life>$t_{exp}$, then the process proceeds to 155, FIG. 5 in order to further perform real-time TCO analytics. Otherwise, at 150, if it is determined that the computed new expected life is reduced to less than the $t_{exp}$, then it is not desired to move to that environment and the process proceeds to 153 where the analytics server is used to compute a new environment that does not reduce that component's expected time to fail to below the $t_{exp}$ value. Thus, at process determines at 153 a new modified environment, e.g., a further modification of an environmental condition, e.g., temperature, by an amount delta (Δ) and re-compute a new energy savings amount (e.g., in dollars $) by returning to 146, FIG. 4 and repeat the steps 146, 149, 150 until the condition life>$t_{exp}$ is satisfied. For example, if it is determined that by raising the operating temperature by 2 degrees the remaining life expectation of that component becomes less than the reference expected life value $t_{exp}$, steps 146-150 may be re-run to compute a new environment. For example, it may then be further determined that by raising the operating temperature at the data center by only 1 degree, may bring the newly calculated life expectancy value for that component to be greater than $t_{exp}$ (within its reference life expectancy). Thus, the life of that piece of hardware would be extended while the data center operating environment is at a lowest cost.

Turning now to FIG. 5, there is depicted the continuing method for conducting the real-time TCO analytics in system 55. At 155, a determination is made as to whether the environment gets life to a $t_{min}$ identified at step 140, FIG. 4 representing the minimum cost of replacing that component. If it is determined that the environment does achieve, for that component, a new life expectancy to a $t_{min}$ (the low cost time to replace it) then the process proceeds to 160 where the new environment is logged with a new cost savings value determined at 143 and/or 146. Then, at 163, a scheduler is accessed and receives input of a date to schedule to replace the component or part at the time $t_{min}$. Then, the process continues to 202, FIG. 6 in order to further perform real-time TCO analytics.

Returning to 155, FIG. 5, if it is determined that the environment does not get life to $t_{min}$, then the process proceeds to 165 where the system computes a new time (t**) which is a time (<$t_{min}$) to replace the component, i.e., a time that is not the minimum cost to replace, e.g., replacing the component in three weeks instead of waiting a two months time $t_{min}$. Then, at 168, a replacement cost penalty (e.g., "$ Replace") is computed. Then, at 170, a trade-off determination is made as whether operational cost savings by moving to the new environment is greater than the replacement cost savings of the component, i.e., whether a condition of:

$$(\$ \text{ OpEx Savings} - \$ \text{ Replace}) > 0$$

is met. If this condition is not met, i.e., the replacement cost penalty exceeds any savings in moving to the new environment, then the process proceeds to step 172, where a new modified environment is computed by the PAS to get that component to be replaced at the lowest cost of replacement, i.e., the time $t_{min}$ and compute a new cost savings. Then, at 174, the new environment and the new computed operational cost savings $ OpEx is logged. Then, at 176, the system accesses a maintenance scheduler and inputs a date to schedule the replacement of the component or part at the time $t_{min}$. Then, the process continues to 202, FIG. 6 in order to further perform real-time TCO analytics leading to a corrective action.

Returning to 170, FIG. 5, if it is determined that the condition of: ($ OpEx Savings–$ Replace)>0 is satisfied, i.e., the savings in moving to the new environment exceeds the replacement cost at time t, then the process proceeds to 173, to note the current environment. Then, at 175, it is noted, e.g., in the scheduler, that the part needs a replacement at the time t (e.g., a time ($<t_{min}$)). Then, the process continues to 202, FIG. 6 in order to further perform real-time TCO analytics.

In the method 200 for maximizing a cost-efficiency of a data center using predicative analytics model shown in FIG. 6, the real-time TCO analysis steps continues from step 135, FIG. 4, step 163, FIG. 5, step 175, FIG. 5, and step 176, FIG. 5. In one embodiment, the method 200 first determines whether all of the non-failed hardware components being analyzed in the data center have been processed. That is, the steps of FIG. 6 may be performed at the level of the whole data center, e.g., every non-failed hardware component, or at a level of specific components making up a row or other part of the data center. Thus, the algorithm may be used on a set of racks of servers associated with one set of cooling units for example. Thus, if all the components have not been processed, the method at 205 accesses the assigned data and information for the next hardware component in the data center and returns to step 95, FIG. 3 in which TCO analytics processing of FIGS. 3-5 is repeated for the next component. If all components have been analyzed, then the process continues at 203, FIG. 6, where a determination is made as to whether any critical components were identified. If any critical components were identified during the processing of FIGS. 3-5, then the process proceeds to 204 where an environment that has been logged to optimize the TCO is chosen for modification to extend the life of the critical component, wherein the environment that has been chosen is for a critical component having a lowest remaining life value (i.e., life–$t_{exp}$). The process then proceeds to 250, FIG. 7 for the real-time TCO analytics system to automatically take or recommend a corrective action, e.g., suggest or initiate a modification of an environmental condition of the data center environment.

Otherwise, at 203, if it is determined that no critical components were identified during the processing of FIGS. 3-5, then the process proceeds to 206, FIG. 6, where the method ranks those analyzed components based on a cost savings (e.g., highest to lowest). For example, given the list of components and their cost savings, new environment and replacement time and replacement cost penalty that have been logged, the result of processing would be to generate a recommendation to move to a modified environment that would result in the most cost savings and be acceptable for all other components. Then, at 209, the method selects an environment computed for the first component in the list and at 213, uses the predictive analytics server to compute a life of all the remaining components of the data center in the new (modified) environment. Then, a determination is made at 216 as to whether all component lives are acceptable, i.e., life>$t_{exp}$. If it is determined that the computed lives of all the remaining data center components are acceptable, then the process proceeds to 222 in which the current selected environment is chosen and steps are taken to modify the environment in the manner as determined by the predictive analytics. The process then proceeds to 250, FIG. 7 for real-time TCO automated analysis corrective action, e.g., automatically schedule a component replacement time, or provide a warning to the operator to initiate a control to modify the environmental condition in the manner as computed to minimize energy consumption.

Otherwise, returning to 216, if it is determined that the computed lives of all the remaining data center components are not sustainable if the embodiment should be modified as computed in the methods of FIGS. 3-5, then the process proceeds to 220 where the current environment is removed from the list and the process returns back to step 209 to increment the selection to the next component on the list of ranked component based on by cost savings. Then the process returns to 209 in which the next component of the ranked component list is selected, and the process steps of 213 and 216 are repeated to determine whether all the remaining component lives are acceptable. The steps 209, 213, 216 and 220 are repeated until an environment computed along the lines described in connection with FIGS. 3-5 is found in which all components lives are deemed acceptable and achieve the greatest cost savings.

Figure 7:
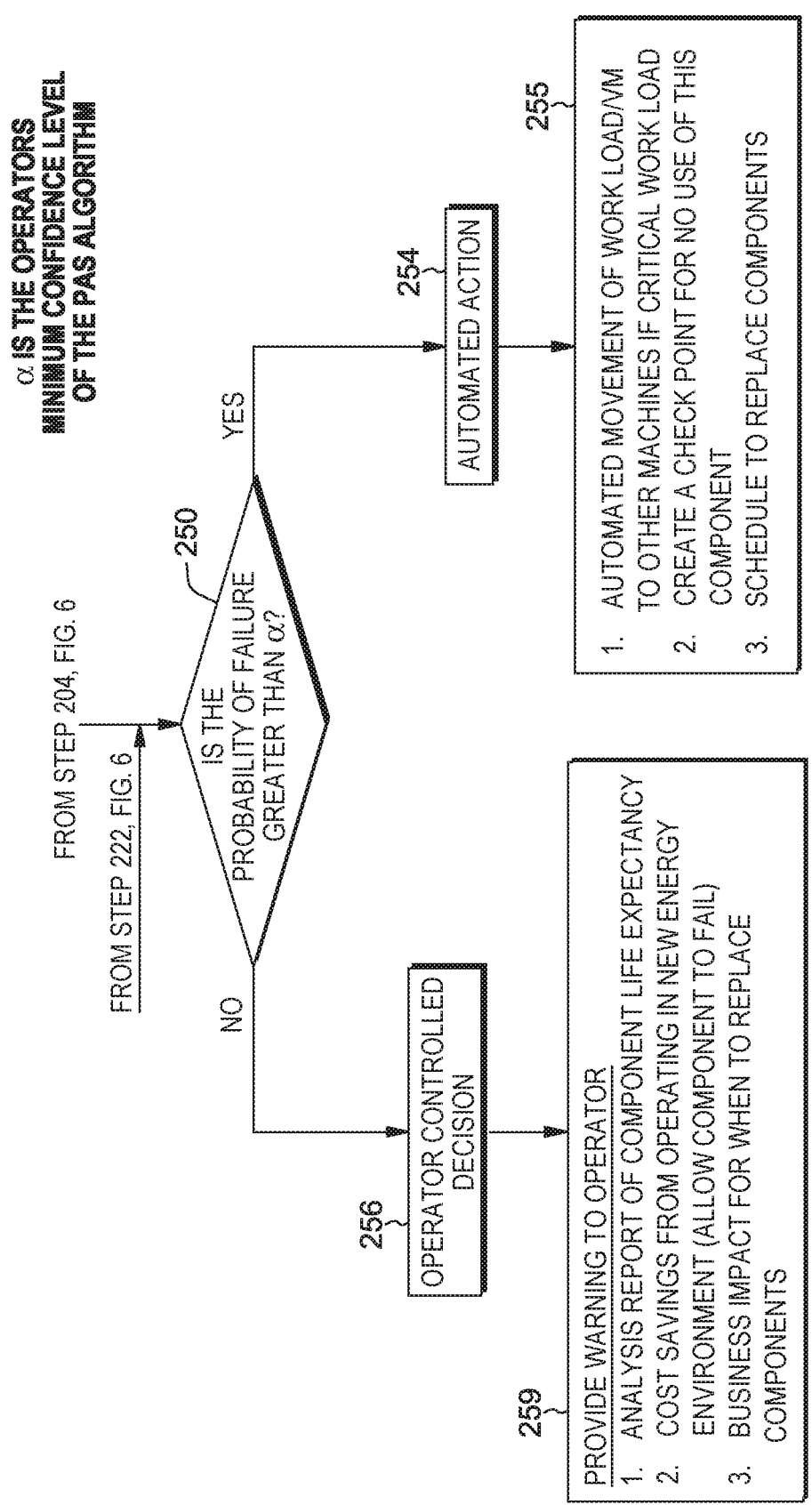
FIG. 7 illustrates a method for corrective actions based on TCO analytics of FIGS. 3-6.

Turning now to FIG. 7, a method for corrective actions based on TCO analytics is implemented as continuing from step 204 or step 222, FIG. 6. The method commences at 250 where a determination is made as to whether a computed probability of failure for the chosen environment is greater than a set threshold "α" where α represents the operator's minimum confidence level of the Predictive Analytics Server algorithm. For example, this threshold value may be pre-determined at the PAS and/or set by a user at any time to indicate a confidence interval that the component part may live to beyond the computed $t_{min}$ or t** and not replace. If at 250, FIG. 7, it is determined that the probability of failure for the chosen environment is greater than threshold α, then the process proceeds to 254 where there may be performed automated action 255 (e.g., a pre-defined level of action) including the following steps: 1) Automatically moving a work load/VM (virtual machine) to other machines if critical work load; 2) Creating various check points for this component; 3) scheduling a replacement of that component(s); and 4) Modifying a condition of the environment.

Alternately, referring back to 250, FIG. 7, if it is determined that the probability of failure for the chosen environment is less than the threshold α, then the process proceeds to 256 where there is automatically generated a warning 259 (e.g., another pre-defined action) and providing the warning to an operator including: 1) Generating/providing an analysis report of computed component life expectancy "life" value; 2) The determined cost savings from operating in a new energy environment (allowing component to fail); and 3) The determined business impact for when to replace components.

Figure 8:
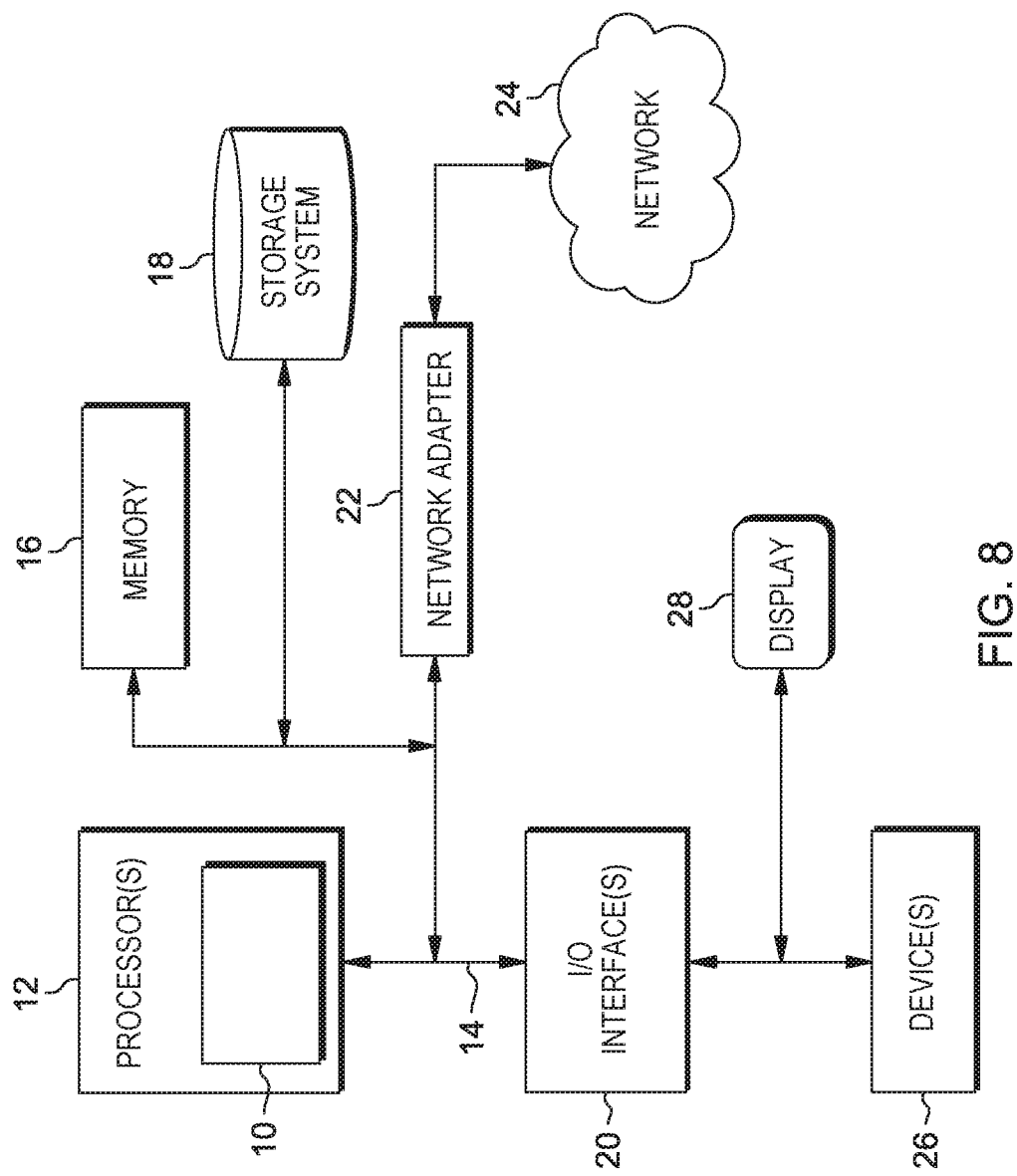
FIG. 8 illustrates a schematic of an example computer or processing system that may implement the methods for maximizing an efficiency of a data center using a predicative analytics model.

FIG. 8 illustrates a schematic of an example computer or processing system that may implement the methods for determining a TCO of a data center and/or maximizing a cost-efficiency (minimizing an energy use) of a data center using predicative analytics modeling in the embodiments of the present disclosure. The computer system is only one example of a suitable processing system and is not intended to suggest any limitation as to the scope of use or functionality of embodiments of the methodology described herein. The processing system shown may be operational with numerous other general purpose or special purpose computing system environments or configurations. Examples of well-known computing systems, environments, and/or configurations that may be suitable for use with the processing system shown in FIG. 2 may include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

The computer system may be described in the general context of computer system executable instructions, such as program modules, being executed by a computer system. Generally, program modules may include routines, programs, objects, components, logic, data structures, and so on that perform particular tasks or implement particular abstract data types. The computer system may be practiced in distributed cloud computing environments where tasks are performed by remote processing devices that are linked through a communications network. In a distributed cloud computing environment, program modules may be located in both local and remote computer system storage media including memory storage devices.

The components of computer system may include, but are not limited to, one or more processors or processing units 12, a system memory 16, and a bus 14 that couples various system components including system memory 16 to processor 12. The processor 12 may include a module 10 that performs the methods described herein. A resource-recall and decision engine module 10 having instructions employing the methods herein may be programmed into the integrated circuits of the processor 12, or loaded from memory 16, storage device 18, or network 24 or combinations thereof.

Bus 14 may represent one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system may include a variety of computer system readable media. Such media may be any available media that is accessible by computer system, and it may include both volatile and non-volatile media, removable and non-removable media.

System memory 16 can include computer system readable media in the form of volatile memory, such as random access memory (RAM) and/or cache memory or others. Computer system may further include other removable/non-removable, volatile/non-volatile computer system storage media. By way of example only, storage system 18 can be provided for reading from and writing to a non-removable, non-volatile magnetic media (e.g., a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 14 by one or more data media interfaces.

Computer system may also communicate with one or more external devices 26 such as a keyboard, a pointing device, a display 28, etc.; one or more devices that enable a user to interact with computer system; and/or any devices (e.g., network card, modem, etc.) that enable computer system to communicate with one or more other computing devices. Such communication can occur via Input/Output (I/O) interfaces 20.

Still yet, computer system can communicate with one or more networks 24 such as a local area network (LAN), a general wide area network (WAN), and/or a public network (e.g., the Internet) via network adapter 22. As depicted, network adapter 22 communicates with the other components of computer system via bus 14. It should be understood that although not shown, other hardware and/or software components could be used in conjunction with computer system. Examples include, but are not limited to: microcode, device drivers, redundant processing units, and external disk drive arrays, RAID systems, tape drives, and data archival storage systems, etc.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The invention claimed is:

1. A computer-implemented method to manage environmental conditions of a data center comprising:
  receiving, at a processor unit of a computer, sensor data from sensors monitoring environmental conditions at a data center, the data center housing operating hardware components that have not yet failed, and receiving reliability data of the hardware components; and
  for each hardware component:
  deriving, using an analytics model stored in a memory storage unit of the computer, an estimated time to failure of the hardware component, said analytics model being run on a processor unit and trained using machine learning, to correlate a component reliability using learned patterns of component failure, said received reliability data and said sensor data of monitored environmental conditions that the hardware component has been subject to at said data center;
  determining, at the processor unit, whether said estimated time to failure of the hardware component exceeds an expected reference life criteria time $t_{exp}$ associated with that component, and for each hardware component having a derived estimated time to failure that does not exceed the expected reference life criteria time $t_{exp}$ for the respective component:

computing, using the processor unit, a respective time for incurring a lowest cost to replace or repair the component;

generating, using the processor unit, a candidate modification to one or more environmental conditions of said data center, wherein said candidate modification to said one or more environment conditions minimizes energy usage of operations at the data center and extends a life of the respective component while operating under said candidate modification to one or more environmental conditions at said data center to its respective lowest cost time to replace;

computing, using the processor unit, an energy cost impact of letting the respective component operate under said candidate modified environment condition at said data center; and after generating a candidate modified environment condition associated with each hardware component having a derived estimated time to failure that does not exceed the expected reference life criteria time $t_{exp}$ for the respective component:

selecting, using the processor unit, an environmental condition modification from said generated candidate modified environment conditions, said selected environmental condition modification corresponding to a respective hardware component having a largest computed energy savings impact and running said analytics model on said processor to derive a new estimated time to failure of remaining hardware components having less than largest energy savings impact, said environmental condition modification selection ensuring that the new derived estimated time to failure of each remaining hardware component exceeds its respective said expected reference life criteria time if operating under the selected modification environment condition;

generating, using the processor unit, an output signal for use in modifying said data center environment according to said selected environment condition modification;

modifying said data center environment according to said selected environment condition modification, and scheduling a replacement of the hardware component corresponding to the selected environmental condition modification having the largest computed energy savings impact in the data center based on said computed time for incurring a lowest cost to replace or repair the component.

2. The method as claimed in claim 1, wherein for a hardware component that is a critical component required for continuous operations, said method further comprising:

determining a time said critical component is expected to fail;

computing a data center environment modification to extend life of the critical component to be greater than a first predetermined time t* representing a time buffer between an expectation of failure and a replacement of the critical component; and modifying the environment at said data center to extend said life of the critical component.

3. The method as claimed in claim 1, wherein said generating said candidate modification to one or more environmental conditions comprises:

computing a new expected life (life) for the component operating under said candidate modified environment condition of said data center environment; and determining whether said computed life is greater than said expected reference life criteria ($t_{exp}$), and if said computed life is not greater than $t_{exp}$, changing an environment condition to produce a new changed candidate data center environment and computing a new energy savings of moving to said new changed candidate data center environment, wherein said computing an energy cost savings, said computing a new expected life, said determining whether said computed life is greater than said $t_{exp}$ and said changing an environment condition are repeated until the computed expected life is greater than said $t_{exp}$.

4. The method as claimed in claim 3, wherein when said expected life is greater than $t_{exp}$:

determining whether the new changed candidate data center environment will adjust the expected life to equal said $t_{min}$ time value; and if the new data center environment adjusts the expected life to a value of $t_{min}$, generating a recommendation to schedule a replacement part for said component at a time $t_{min}$; otherwise, if it is determined that the new data center environment does not adjust the expected life to a value of $t_{min}$:

compute a new time t representative of another time in which to schedule a replacement for the component, wherein t time is earlier than said $t_{min}$ time value;

computing a replacement cost penalty for replacing the component at said new time t**;

determining whether said energy cost savings of moving from a current data center environment to said new data center environment exceeds said replacement cost penalty; and if said energy cost savings of moving from a current data center environment to said new data center environment exceeds said replacement cost penalty, then record the current environment and recommend scheduling a replacement part for said component at a time t**;

otherwise, if said energy cost savings by moving from a current data center environment to said new data center environment does not exceed said replacement cost penalty:

computing a new data center environment to adjust the expected life to equal a value of $t_{min}$; and recommending scheduling a replacement part for said hardware component at a time $t_{min}$.

5. A computer program product comprising:

one or more computer readable storage media and program instructions stored on the one or more computer readable storage media, the program instructions, when executed by at least one computer, cause said at least one computer to perform a process for managing environmental conditions of a data center, the program instructions comprising instructions configuring a processor unit of said at least one computer to:

receive sensor data from sensors monitoring environmental conditions at a data center, the data center housing operating hardware components that have not yet failed, and receive reliability data of the hardware components; and for each hardware component:

derive, using an analytics model stored in the one or more computer readable storage media of the at least one computer, an estimated time to failure of the hardware component, said analytics model being run on a processor unit and trained using machine learning, to correlate a component reliability using learned patterns of component failure, said received reliability data and said sensor data of monitored environmental conditions that the hardware component has been subject to at said data center;

determine whether said estimated time to failure of the hardware component exceeds an expected reference life criteria time $t_{exp}$ associated with that component, and for each hardware component having a derived estimated time to failure that does not exceed the expected reference life criteria time $t_{exp}$ for the respective component:

compute a respective time for incurring a lowest cost to replace or repair the component;

generate a candidate modification to one or more environmental conditions of said data center, wherein said candidate modification to said one or more environmental conditions minimizes energy usage of operations at the data center and extends a life of the respective component while operating under said modified candidate modification to one or more environmental conditions at said data center to its respective lowest cost time to replace;

compute an energy cost impact of letting the respective component operate under said candidate modified environment condition at said data center; and after generating a candidate modified environment condition associated with each hardware component having a derived estimated time to failure that does not exceed the expected reference life criteria time $t_{exp}$ for the respective component:

select an environmental condition modification from said generated candidate modified environment conditions, said selected environmental condition modification corresponding to a respective hardware component having a largest computed energy savings impact, and run said analytics model on said processor to derive a new estimated time to failure of remaining hardware components having less than largest energy savings impact, said environmental condition modification selection ensuring that the new derived estimated time to failure of each remaining hardware component exceeds its respective said expected reference life criteria time if operating under the selected modification environment condition;

generate an output signal for use in modifying said data center environment according to said selected environment condition modification;

modify said data center environment according to said selected environment condition modification, and schedule a replacement of the hardware component corresponding to the selected environmental condition modification having the largest computed energy savings impact in the data center based on said computed time for incurring a lowest cost to replace or repair the component.

6. The computer program product of claim 5, wherein for a hardware component that is a critical component required for continuous operations, said program instructions further comprise instructions configuring a processor unit of said at least one computer to:

determine a time said critical component is expected to fail;

compute a data center environment modification to extend life of the critical component to be greater than a first predetermined time $t^*$ representing a time buffer between an expectation of failure and a replacement of the critical component; and modify the environment at said data center to extend said life of the critical component.

7. The computer program product of claim 5, wherein to generate said candidate modification to one or more environmental conditions, said program instructions further comprise instructions configuring the processor unit of said at least one computer to:

compute a new expected life (life) for the component operating under said candidate modified environment condition of said data center environment; and determine whether said computed life is greater than said expected reference life criteria ($t_{exp}$), and if said computed life is not greater than $t_{exp}$, changing an environment condition to produce a new changed candidate data center environment and computing a new energy savings of moving to said new changed candidate data center environment, wherein said computing a new energy savings, said computing a new expected life, said determining whether said computed life is greater than said $t_{exp}$ and said changing an environment condition are repeated until the computed expected life is greater than said $t_{exp}$.

8. The computer program product of claim 7, wherein when said expected life is greater than $t_{exp}$, said program instructions further comprise instructions configuring a processor unit of said at least one computer to:

determine whether the new changed candidate data center environment will adjust the expected life time to equal said $t_{min}$ time value; and if the new changed candidate data center environment adjusts the expected life to a value of $t_{min}$, generate a recommendation to schedule a replacement part for said component at a time $t_{min}$; otherwise, if it is determined that the new data center environment does not adjust the expected life to a value of $t_{min}$:

compute a new time $t^{}$ representative of another time in which to schedule a replacement for the component, wherein $t^{}$ is earlier than $t_{min}$;

compute a replacement cost penalty for replacing the component at said new time $t^{**}$;

determine whether said energy cost savings of moving from a current data center environment to said new data center environment exceeds said replacement cost penalty; and if said energy cost savings of moving from a current data center environment to said new data center environment exceeds said replacement cost penalty, then record the current environment and recommend scheduling a replacement part for said component at a time $t^{**}$;

otherwise, if said energy cost savings by moving from a current data center environment to said new data center environment does not exceed said replacement cost penalty:

compute a new data center environment to adjust the expected life to equal a value of $t_{min}$; and recommend scheduling a replacement part for said hardware component at a time $t_{min}$.

9. A computer-implemented system for managing environmental conditions of a data center, the system comprising:

a memory storage device storing program instructions;
at least one hardware processor coupled to the memory storage device and running said program instructions to configure said at least one hardware processor to:
receive sensor data from sensors monitoring environmental conditions at a data center, the data center housing operating hardware components that have not yet failed, and receive reliability data of the hardware components; and
for each hardware component:
derive, using an analytics model stored in the memory storage device, an estimated time to failure of the hardware component, said analytics model being run on a processor unit and trained using machine learning, to correlate a component reliability using learned patterns of component failure, said received reliability data and said sensor data of monitored environmental conditions at said data center;
determine whether said estimated time to failure of the hardware component exceeds an expected reference life criteria time $t_{exp}$ associated with the component, and
for each hardware component having a derived estimated time to failure that does not exceed the expected reference life criteria time $t_{exp}$ for the respective component:
compute a respective time for incurring a lowest cost to replace or repair the component;
generate a candidate modification to one or more environmental conditions of said data center, wherein said candidate modification to said one or more environmental conditions minimizes energy usage of operations at the data center, and extends a life of the respective component while operating under said candidate modification to one or more environmental conditions at said data center to its respective lowest cost time to replace;
compute an energy cost impact to an entity of letting the respective component operate under said candidate modified environment condition at said data center; and
after generating a candidate modified environment condition associated with each hardware component having a derived estimated time to failure that does not exceed the expected reference life criteria time $t_{exp}$ for the respective component:
select an environmental condition modification from said generated candidate modified environment conditions, said selected environmental condition modification corresponding to a respective hardware component having a largest computed energy savings impact and run said analytics model on said processor to derive a new estimated time to failure of remaining hardware components having less than largest energy savings impact, said environmental condition modification selection ensuring that the new derived estimated time to failure of each remaining hardware component exceeds its respective said expected reference life criteria time if operating under the selected modification environment condition;
generate an output signal for use in modifying said data center environment according to said selected environment condition modification;
modify said data center environment according to said selected environment condition modification, and
schedule a replacement of the hardware component corresponding to the selected environmental condition modification having the largest computed energy savings impact in the data center based on said computed time for incurring a lowest cost to replace or repair the component.

10. The computer-implemented system of claim 9, wherein for a hardware component that is a critical component required for continuous operations, said program instructions further configure said at least one hardware processor to:
determine a time said critical component is expected to fail;
compute a data center environment modification to extend life of the critical component to be greater than a first predetermined time t* representing a time buffer between an expectation of failure and a replacement of the critical component; and
modify the environment at said data center to extend said life of the critical component.

11. The computer-implemented system of claim 10, wherein to generate said candidate modification to one or more environmental conditions, said program instructions further configure said at least one hardware processor to:
compute a new expected life (life) for the component operating under said candidate modified environment condition of said data center environment; and
determine whether said computed life is greater than said expected reference life criteria ($t_{exp}$), and if said computed life is not greater than $t_{exp}$, changing an environment condition to produce a new changed candidate data center environment and computing a new energy savings of moving to said new changed candidate data center environment, wherein said computing an energy cost impact, said computing a new expected life, said determining whether said computed life is greater than said $t_{exp}$ and said changing an environment condition are repeated until the computed expected life is greater than said $t_{exp}$.

12. The computer-implemented system of claim 11, wherein when said expected life is greater than $t_{exp}$, said program instructions further configure said at least one hardware processor to:
determine whether the new changed candidate data center environment will adjust the expected life to equal said $t_{min}$ time value; and
if the new data center environment adjusts the expected life to a value of $t_{min}$,
generate a recommendation to schedule a replacement part for said hardware component at a time $t_{min}$; otherwise,
if it is determined that the new data center environment does not adjust the expected life to a value of $t_{min}$:
compute a new time t representative of another time in which to schedule a replacement for the component, wherein t is earlier than $t_{min}$;
compute a replacement cost penalty for replacing the component at said new time t**;
determine whether said energy cost savings of moving from a current data center environment to said new data center environment exceeds said replacement cost penalty; and
if said energy cost savings of moving from a current data center environment to said new data center environment exceeds said replacement cost penalty, then record the current data center environment and recommend scheduling a replacement part for said component at a time t**;

otherwise, if said energy cost savings by moving from a current data center environment to said new data center environment does not exceed said replacement cost penalty:
compute a new data center environment to adjust the expected life to equal a value of $t_{min}$; and
recommend scheduling a replacement part for said component at a time $t_{min}$.

\* \* \* \* \*